（12） United States Patent
He et al.

(10) Patent No.: US 10,721,592 B2
(45) Date of Patent: Jul. 21, 2020

(54) V2X COMMUNICATION METHOD AND DEVICE

(71) Applicant: ZTE CORPORATION, Shenzhen, Guangdong (CN)

(72) Inventors: Haigang He, Guangdong (CN); Youxiong Lu, Guangdong (CN); Shuanghong Huang, Guangdong (CN); Jie Chen, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/079,501

(22) PCT Filed: Feb. 10, 2017

(86) PCT No.: PCT/CN2017/073234
§ 371 (c)(1),
(2) Date: Aug. 23, 2018

(87) PCT Pub. No.: WO2017/143913
PCT Pub. Date: Aug. 31, 2017

(65) Prior Publication Data
US 2019/0053008 A1   Feb. 14, 2019

(30) Foreign Application Priority Data

Feb. 23, 2016   (CN) .......................... 2016 1 0099239

(51) Int. Cl.
*H04L 29/08*     (2006.01)
*H04W 28/02*    (2009.01)
(Continued)

(52) U.S. Cl.
CPC ............. *H04W 4/027* (2013.01); *H04W 4/40* (2018.02); *H04W 8/005* (2013.01);
(Continued)

(58) Field of Classification Search
CPC ... H04W 4/027; H04W 4/40; H04W 28/0226; H04W 8/005; H04W 28/02; H04W 28/08;
(Continued)

(56) References Cited

U.S. PATENT DOCUMENTS

2016/0174122 A1*   6/2016   Sorrentino ........... H04B 1/3822
                                                    370/331
2016/0295624 A1*  10/2016   Novlan ................. H04W 76/14
(Continued)

FOREIGN PATENT DOCUMENTS

| CN | 104537889 A | 4/2015 |
| CN | 104639627 A | 5/2015 |
| CN | 105280005 A | 1/2016 |

OTHER PUBLICATIONS

International Search Report for PCT/CN2017/073234, dated May 3, 2017 in 5 pages.
(Continued)

*Primary Examiner* — Un C Cho
*Assistant Examiner* — Peter K Mak
(74) *Attorney, Agent, or Firm* — Knobbe, Martens, Olson & Bear LLP

(57) ABSTRACT

Provided are a V2X communication method and device. The method includes: acquiring user attribute information; determining a detection parameter for detecting first V2X information according to the user attribute information, and detecting the first V2X information according to the detection parameter; and/or determining a sending parameter for sending second V2X information according to the user attribute information, and sending the second V2X information according to the sending parameter. The solution solves the problems of resource congestion and limited energy which are prone to occur in V2X communication in the related art, thereby achieving the purpose of improving
(Continued)

the reliability of V2X communication, implementing congestion control and saving energy.

9 Claims, 3 Drawing Sheets

(51) Int. Cl.
    *H04W 4/02* (2018.01)
    *H04W 4/40* (2018.01)
    *H04W 84/00* (2009.01)
    *H04W 72/04* (2009.01)
    *H04W 8/00* (2009.01)
    *H04W 28/08* (2009.01)

(52) U.S. Cl.
    CPC ..... *H04W 28/0226* (2013.01); *H04W 72/048* (2013.01); *H04W 72/0453* (2013.01); *H04W 28/02* (2013.01); *H04W 28/08* (2013.01); *H04W 84/005* (2013.01); *Y02D 70/126* (2018.01)

(58) Field of Classification Search
    CPC ........... H04W 72/0453; H04W 72/048; H04W 84/005
    See application file for complete search history.

(56) References Cited

U.S. PATENT DOCUMENTS

| | | | |
|---|---|---|---|
| 2016/0381538 A1* | 12/2016 | Tan | H04W 4/90 455/404.2 |
| 2018/0242287 A1* | 8/2018 | Chae | H04J 13/00 |
| 2018/0302202 A1* | 10/2018 | Kim | H04L 5/0053 |
| 2019/0004179 A1* | 1/2019 | Hwang | H04W 4/46 |
| 2019/0028974 A1* | 1/2019 | Wang | H04W 52/243 |

OTHER PUBLICATIONS

ZTE, "Scheduling Assignment enhancement for V2V" R1-160683, 3GPPTSG-RAN WG1 Meeting #84, Feb. 6, 2016.

\* cited by examiner

V2X COMMUNICATION METHOD AND DEVICE

CROSS REFERENCE TO RELATED APPLICATIONS

This application is the National Phase Application under 35 U.S.C. § 371 of International Patent Application No. PCT/CN2017/073234, filed on Feb. 10, 2017, which claims priority to Chinese Patent Application No. 201610099239.8, filed on Feb. 23, 2016, the entire disclosure of each of which is hereby incorporated by reference.

TECHNICAL FIELD

The present disclosure relates to the communications field, and, in particular, to a V2X communication method and device.

BACKGROUND

In recent years, with the rapid development of the world economy and the Chinese economy, vehicles have become a highly popular means of transportation in many countries in the world, including China. Moreover, the penetration rate of vehicles will continue to increase. While vehicles bring convenience to people's lives, they also inevitably have some negative impacts on humans, such as traffic accidents, urban congestion, and environmental impacts. From the perspective of traffic accidents, taking China as an example, there were 204,196 traffic accidents in 2012, with 59,997 deaths, 224,327 injuries and direct property losses of 1.175 billion yuan.

With the rise of the Internet of Vehicles technology, the above problems can be solved to some extent. The Internet of Vehicles refers to a large system network for wireless communication and information exchange between the vehicle-X (X: car, road, pedestrian and Internet) in accordance with the agreed communication protocol and data interaction standards. There are three different types of the Internet of Vehicles communication: Vehicle to Vehicle (V2V), Vehicle to Infrastructure (V2I), and Vehicle to Pedestrian (V2P), which are collectively referred to as V2X communication. In V2I communication, Infrastructure can also be called a Road Side Unit (RSU).

In solving the problem of traffic accidents, the V2V and V2I systems can avoid 83% of light vehicle accidents and 79% of heavy truck accidents respectively. After being deployed in the United States, V2V technology can help avoid 25-592 thousand traffic accidents per year, save 49-1083 lives, avoid 1.1-27 million injuries, and reduce 31-728 thousand property-only accidents. In addition, V2X technology can also solve problems such as urban congestion and environmental pollution. For example, vehicle fuel consumption and carbon dioxide emissions are reduced by 2.3% through only an application of V2X in-vehicle speed limit alert.

Currently, the 3rd Generation Partnership Project (3GPP) is has begun research on V2X communication based on Long Term Evolution (LTE). In Device to Device (D2D) communication mode of the LTE system, when a service needs to be transmitted between user equipments (UEs), data of the service between the UEs is not forwarded by the base station, but is directly transmitted by the source UE to the target UE through the air interface. FIG. 1 is a schematic diagram of a D2D communication structure in the related art. As shown in FIG. 1, this communication mode has characteristics that are distinct from the communication mode of the traditional cellular system. For V2V communication of the Internet of Vehicles, the D2D communication mode is used, thereby achieving the effects of saving wireless spectrum resources, reducing the data transmission pressure of the core network, reducing system resource occupation, increasing the spectrum efficiency of a cellular communication system, reducing the transmit power consumption of a terminal and saving network operation costs to a large extent.

In V2X communication, some features and requirements of V2X communication include that V2X communication requires high communication reliability, the number of devices participating in communication is huge, and resource congestion is prone to occur. In addition, in V2P communication, the battery capacity of the handheld terminal held by pedestrians is limited, and it is necessary to additionally consider the energy saving problem of the handheld terminal of the pedestrian in V2P communication.

No efficient solution has been provided to meet requirements and solve problems of V2X communication in the related art.

SUMMARY

The disclosure provides a V2X communication method and device to solve at least the problems of resource congestion and energy limitation which are prone to occur in V2X communication in the related art.

According to one aspect of the present disclosure, a V2X communication method is provided. The method includes: acquiring user attribute information; determining a detection parameter for detecting first V2X information according to the user attribute information, and detecting the first V2X information according to the detection parameter; and/or determining a sending parameter for sending second V2X information according to the user attribute information, and sending the second V2X information according to the sending parameter.

In an exemplary embodiment, the user attribute information includes at least one of the following: geographic location information of a first user equipment (UE), geographic location information of a second UE except the first UE, distance information between the first UE and the second UE, motion track information of the first UE, motion track information of the second UE, velocity and/or speed information of the first UE, velocity and/or speed information of the second UE, acceleration information of the first UE, a service type of the first UE, and load information of time-frequency resources of the first UE. The first UE is used for detecting the first V2X information and/or sending the second V2X information; and/or, the detection parameter includes a detection frequency of the first V2X information; and/or, the sending parameter includes a sending frequency of the second V2X information, a number of retransmissions for sending the second V2X information, and a modulation mode and/or an encoding rate for sending the second V2X information; and/or, the first V2X information includes first V2X control information and/or first V2X data information; and/or, the second V2X information includes second V2X control information and/or second V2X data information.

In an exemplary embodiment, acquiring at least one of the geographic location information of the second UE, the distance information between the first UE and the second UE, and the motion track information of the second UE, which are included in the user attribute information, includes: acquiring at least one of the geographic location information of the second UE, the distance information between the first UE and the second UE and the motion track information of the second UE according to third V2X information acquired from the second UE.

In an exemplary embodiment, determining a detection parameter for detecting the first V2X information according to the user attribute information includes at least one of the following: determining a probability that the first UE has V2X communication demands according to the geographic location information of the first UE included in the user attribute information, and determining a detection frequency of the first V2X information included in the detection parameter according to the probability that the first UE has V2X communication demands; determining whether the distance between the first UE and the second UE is less than a first predetermined distance according to the distance information between the first UE and the second UE, and determining the detection frequency of the first V2X information included in the detection parameter according to a result of the determining; as well as determining a probability that the first UE and the second UE collide according to the motion track information and/or the geographic location information and/or the speed information of the first UE and the motion track information and/or the geographic location information and/or the speed information of the second UE included in the user attribute information, and determining the detection frequency of the first V2X information included in the detection parameter according to the probability that the first UE and the second UE collide.

In an exemplary embodiment, determining a sending parameter for sending second V2X information according to the user attribute information includes at least one of the following: determining a probability that the first UE has V2X communication demands according to the geographic location information of the first UE included in the user attribute information and determining the sending frequency of the second V2X information included in the sending parameter according to the probability that the first UE has V2X communication demands; determining whether the distance between the first UE and the second UE is less than a second predetermined distance according to the distance information between the first UE and the second UE included in the user attribute information and determining the sending frequency of the second V2X information included in the sending parameter according to a determination result; determining a probability that the first UE and the second UE collide according to the motion track information and/or the geographic location information and/or the speed information of the first UE and the motion track information and/or the geographic location information and/or the speed information of the second UE included in the user attribute information and determining the sending frequency of the second V2X information included in the sending parameter according to the probability that the first UE and the second UE collide; determining whether a load of time-frequency resources is higher than a first predetermined load threshold according to the load information of time-frequency resources of the first UE included in the user attribute information and determining the sending frequency of the second V2X information included in the sending parameter according to a determination result; determining whether a velocity and/or speed of the first UE is higher than a first predetermined velocity and/or speed threshold according to the velocity and/or speed information of the first UE included in the user attribute information and determining the sending frequency of the second V2X information included in the sending parameter according to a determination result; determining whether an acceleration of the first UE is higher than a first predetermined acceleration threshold according to the acceleration information of the first UE included in the user attribute information and determining the sending frequency of the second V2X information included in the sending parameter according to a determination result; as well as determining whether the service type of the first UE belongs to a predetermined unexpected and emergent service type according to the service type of the first UE included in the user attribute information and determining the sending frequency of the second V2X information included in the sending parameter according to a determination result.

In an exemplary embodiment, determining a sending parameter for sending the second V2X information according to the user attribute information includes at least one of the following: determining a probability that the first UE and the second UE collide according to the motion track information and/or the geographic location information and/or the speed information of the first UE and the motion track information and/or the geographic location information and/or the speed information of the second UE included in the user attribute information and determining a number of retransmissions for sending the second V2X information included in the sending parameter according to the probability that the first UE and the second UE collide; determining whether a load of time-frequency resources is higher than a second predetermined load threshold according to the load information of time-frequency resources of the first UE included in the user attribute information and determining a number of retransmissions for sending the second V2X information included in the sending parameter according to a determination result; determining whether a velocity and/or speed of the first UE is higher than a second predetermined velocity and/or speed threshold according to the velocity and/or speed information of the first UE included in the user attribute information and determining a number of retransmissions for sending the second V2X information included in the sending parameter according to a determination result; determining whether an acceleration of the first UE is higher than a second predetermined acceleration threshold according to the acceleration information of the first UE included in the user attribute information and determining the number of retransmissions for sending the second V2X information included in the sending parameter according to a determination result; and determining whether the service type of the first UE belongs to a predetermined unexpected and emergent service type according to the service type of the first UE included in the user attribute information and determining the number of retransmissions for sending the second V2X information included in the sending parameter according to a determination result.

In an exemplary embodiment, determining a sending parameter for sending the second V2X information according to the user attribute information includes at least one of the following: determining a probability that the first UE and the second UE collide according to the motion track information and/or the geographic location information and/or the speed information of the first UE and the motion track information and/or the geographic location information and/or the speed information of the second UE included in the user attribute information and determining the modulation mode and/or the encoding rate for sending the second V2X information included in the sending parameter according to the probability that the first UE and the second UE collide; determining whether a load of time-frequency resources is higher than a third predetermined load threshold according to the load information of time-frequency resources of the first UE included in the user attribute information and determining the modulation mode and/or the encoding rate for sending the second V2X information included in the sending parameter according to a determination result; determining whether a velocity and/or speed of the first UE is higher than a third predetermined velocity and/or speed threshold according to the velocity and/or speed information of the first UE included in the user attribute information and determining the modulation mode and/or the encoding rate for sending the second V2X information included in the sending parameter according to a determination result; determining whether an acceleration of the first UE is higher than a third predetermined acceleration threshold according to the acceleration information of the first UE included in the user attribute information and determining the modulation mode and/or the encoding rate for sending the second V2X information included in the sending parameter according to a determination result; and determining whether the service type of the first UE belongs to a predetermined unexpected and emergent service type according to the service type of the first UE included in the user attribute information and determining the modulation mode and/or the encoding rate for sending the second V2X information included in the sending parameter according to a determination result.

According to another aspect of the present disclosure, a V2X communication device is provided. The device includes: an acquiring module, which is configured for acquiring user attribute information; and a processing module, which is configured for determining a detection parameter for detecting first V2X information according to the user attribute information, and detecting the first V2X information according to the detection parameter; and/or determining a sending parameter for sending second V2X information according to the user attribute information, and sending the second V2X information according to the sending parameter.

In an exemplary embodiment, the user attribute information includes at least one of the following: geographic location information of a first user equipment (UE), geographic location information of a second UE except the first UE, distance information between the first UE and the second UE, motion track information of the first UE, motion track information of the second UE, velocity and/or speed information of the first UE, velocity and/or speed information of the second UE, acceleration information of the first UE, a service type of the first UE, and load information of time-frequency resources of the first UE. The first UE is used for detecting the first V2X information and/or sending the second V2X information; and/or, the detection parameter includes a detection frequency of the first V2X information; and/or, the sending parameter includes a sending frequency of the second V2X information, a number of retransmissions for sending the second V2X information and a modulation mode and/or an encoding rate for sending the second V2X information; and/or, the first V2X information includes first V2X control information and/or first V2X data information; and/or, the second V2X information includes second V2X control information and/or second V2X data information.

In an exemplary embodiment, when acquiring at least one of the geographic location information of the second UE, the distance information between the first UE and the second UE, and the motion track information of the second UE, which are included in the user attribute information, the acquiring module includes: an acquiring unit, which is configured for acquiring at least one of the geographic location information of the second UE, the distance information between the first UE and the second UE and the motion track information of the second UE according to third V2X information acquired from the second UE.

In an exemplary embodiment, when determining a detection parameter for detecting the first V2X information according to the user attribute information, the processing module includes at least one of the following: a first processing unit, which is configured for determining a probability that the first UE has V2X communication demands according to the geographic location information of the first UE included in the user attribute information, and determining the detection frequency of the first V2X information included in the detection parameter according to the probability that the first UE has V2X communication demands; a second processing unit, which is configured for determining whether the distance between the first UE and the second UE is less than first predetermined distance according to the distance information between the first UE and the second UE included in the user attribute information, and determining the detection frequency of the first V2X information included in the detection parameter according to a determination result; and a third processing unit, which is configured for determining a probability that the first UE and the second UE collide according to the motion track information and/or the geographic location information and/or the speed information of the first UE and the motion track information and/or the geographic location information and/or the speed information of the second UE included in the user attribute information, and determining the detection frequency of the first V2X information included in the detection parameter according to the probability that the first UE and the second UE collide.

In an exemplary embodiment, when determining a sending parameter for sending the second V2X information according to the user attribute information, the processing module includes at least one of the following: a forth processing unit, which is configured for determining a probability that the first UE has V2X communication demands according to the geographic location information of the first UE included in the user attribute information, and determining the sending frequency of the second V2X information included in the sending parameter according to the probability that the first UE has the V2X communication demands; a fifth processing unit, which is configured for determining whether the distance between the first UE and the second UE is less than second predetermined distance according to the distance information between the first UE and the second UE included in the user attribute information, and determining the sending frequency of the second V2X information included in the sending parameter according to a determination result; a sixth processing unit, which is configured for determining a probability that the first UE and the second UE collide according to the motion track information and/or the geographic location information and/or the speed information of the first UE and the motion track information and/or the geographic location information and/or the speed information of the second UE included in the user attribute information, and determining the sending frequency of the second V2X information included in the sending parameter according to the probability that the first UE and the second UE collide; a seventh processing unit, which is configured for determining whether the load of time-frequency resources is higher than a first predetermined load threshold according to the load information of time-frequency resources of the first UE included in the user attribute information, and determining the sending frequency of the second V2X information included in the sending parameter according to a determination result; an eighth processing unit, which is configured for determining whether the velocity and/or speed of the first UE is higher than a first predetermined velocity and/or speed threshold according to the velocity and/or speed information of the first UE included in the user attribute information, and determining the sending frequency of the second V2X information included in the sending parameter according to a determination result; a ninth processing unit, which is configured for determining whether an acceleration of the first UE is higher than a first predetermined acceleration threshold according to the acceleration information of the first UE included in the user attribute information, and determining the sending frequency of the second V2X information included in the sending parameter according to a determination result; and a tenth processing unit, which is configured for determining whether the service type of the first UE belongs to a predetermined unexpected and emergent service type according to the service type of the first UE included in the user attribute information, and determining the sending frequency of the second V2X information included in the sending parameter according to a determination result.

In an exemplary embodiment, when the sending parameter for sending the second V2X information is determined according to the user attribute information, the processing module includes at least one of the following: an eleventh processing unit, which is configured for determining a probability that the first UE and the second UE collide according to the motion track information and/or the geographic location information and/or the speed information of the first UE and the motion track information and/or the geographic location information and/or the speed information of the second UE included in the user attribute information, and determining the number of retransmissions for sending the second V2X information included in the sending parameter according to the probability that the first UE and the second UE collide; a twelfth processing unit, which is configured for determining whether a load of time-frequency resources is higher than a second predetermined load threshold according to the load information of time-frequency resources of the first UE included in the user attribute information, and determining the number of retransmissions for sending the second V2X information included in the sending parameter according to a determination result; a thirteenth processing unit, which is configured for determining whether a velocity and/or speed of the first UE is higher than a second predetermined velocity and/or speed threshold according to the velocity and/or speed information of the first UE included in the user attribute information, and determining the number of retransmissions for sending the second V2X information included in the sending parameter according to a determination result; a fourteenth processing unit, which is configured for determining whether an acceleration of the first UE is higher than a second predetermined acceleration threshold according to the acceleration information of the first UE included in the user attribute information, and determining the number of retransmissions for sending the second V2X information included in the sending parameter according to a determination result; and a fifteenth processing unit, which is configured for determining whether the service type of the first UE belongs to a predetermined unexpected and emergent service type according to the service type of the first UE included in the user attribute information, and determining the number of retransmissions for sending the second V2X information included in the sending parameter according to a determination result.

In an exemplary embodiment, when the sending parameter for sending the second V2X information is determined according to the user attribute information, the processing module includes at least one of the following: a sixteenth processing unit, which is configured for determining a probability that the first UE and the second UE collide according to the motion track information and/or the geographic location information and/or the speed information of the first UE and the motion track information and/or the geographic location information and/or the speed information of the second UE included in the user attribute information, and determining the modulation mode and/or the encoding rate for sending the second V2X information included in the sending parameter according to the probability that the first UE and the second UE collide; a seventeenth processing unit, which is configured for determining whether a load of time-frequency resources is higher than a third predetermined load threshold according to the load information of time-frequency resources of the first UE included in the user attribute information, and determining the modulation mode and/or the encoding rate for sending the second V2X information included in the sending parameter according to a determination result; an eighteenth processing unit, which is configured for determining whether a velocity and/or speed of the first UE is higher than a third predetermined velocity and/or speed threshold according to the velocity and/or speed information of the first UE included in the user attribute information, and determining the modulation mode and/or the encoding rate for sending the second V2X information included in the sending parameter according to a determination result; a nineteenth processing unit, which is configured for determining whether an acceleration of the first UE is higher than a third predetermined acceleration threshold according to the acceleration information of the first UE included in the user attribute information, and determining the modulation mode and/or the encoding rate for sending the second V2X information included in the sending parameter according to a determination result; and a twentieth processing unit, which is configured for determining whether the service type of the first UE belongs to a predetermined unexpected and emergent service type according to the service type of the first UE included in the user attribute information, and determining the modulation mode and/or the encoding rate for sending the second V2X information included in the sending parameter according to a determination result.

An embodiment of the present disclosure further provides a storage medium. Optionally, in this embodiment, the storage medium is configured to store execution instructions for executing one of or a combination of the steps in the above method embodiments.

According to the present disclosure, user attribute information is acquired; a detection parameter for detecting first V2X information is determined according to the user attribute information, and the first V2X information is detected according to the detection parameter; and/or a sending parameter for sending second V2X information is determined according to the user attribute information, and the second V2X information is sent according to the sending parameter. In this way, the present disclosure solves the problems of resource congestion and energy limitation which are prone to occur in V2X communication in the related art thereby improving the reliability of V2X communication and implementing congestion control and energy saving.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in an improper way. In the accompanying drawings.

DETAILED DESCRIPTION

The present disclosure will be described hereinafter in detail with reference to the accompanying drawings in conjunction with the embodiments. It is to be noted that if not in collision, the embodiments and features thereof in the present application can be combined with each other.

It is to be noted that the terms "first", "second" and the like in the description, claims and drawings of the present disclosure are used to distinguish similar objects and are not necessarily used to describe a particular order or sequence.

Figure 1:
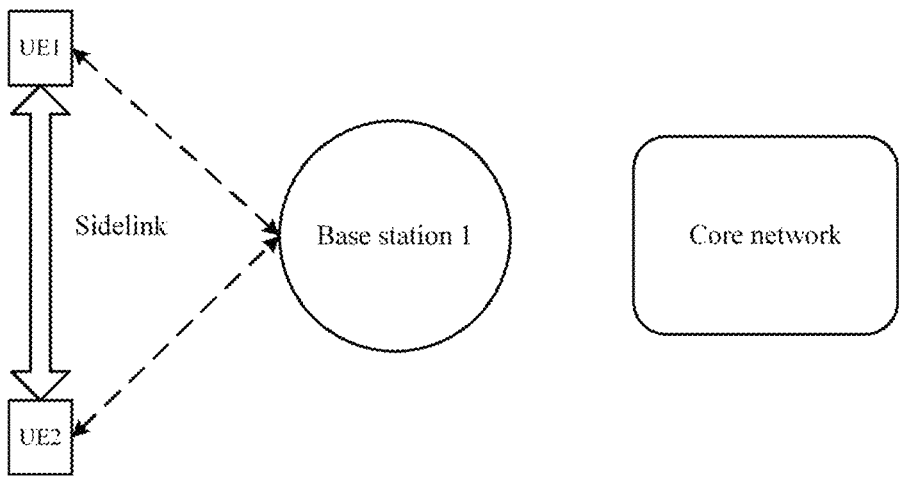
FIG. 1 is a schematic diagram of a D2D communication structure in the related art.
Figure 2:
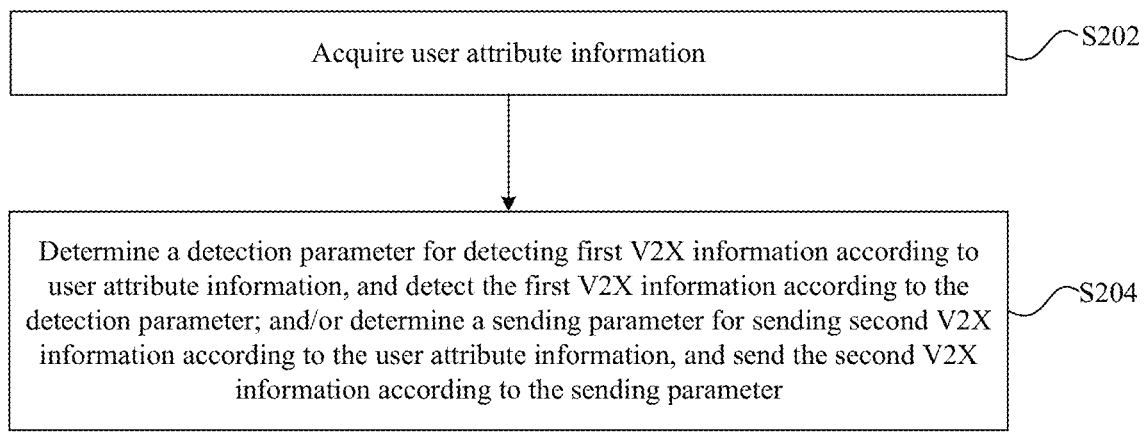
FIG. 2 is a flowchart of a V2X communication method according to an embodiment of the present disclosure.

This embodiment provides a V2X communication method. FIG. 2 is a flowchart of a V2X communication method according to the embodiment of the present disclosure. As shown in FIG. 2, the process of the method includes the steps described below.

In step S202, user attribute information is acquired.

In step S204: a detection parameter for detecting first V2X information is determined according to the user attribute information, and the first V2X information is detected according to the detection parameter; and/or a sending parameter for sending second V2X information is determined according to the user attribute information, and the second V2X information is sent according to the sending parameter.

In this step, the above operation may be performed by a UE (i.e., a first UE described below) and the user attribute information is attribute information related to the first UE and/or attribute information related to a second UE except the first UE.

Through the above steps, the check and/or the sending of the V2X information is performed according to the attribute information of a specific UE, so that a corresponding check parameter and/or a sending parameter can be determined according to an actual situation. In this way, the present disclosure effectively avoids resource congestion, effectively controls the use of energy, and thus solves the problems of resource congestion and energy limitation which are prone to occur in V2X communication in the related art, thereby improving the reliability of V2X communication and implementing congestion control and energy saving.

In an optional embodiment, the user attribute information includes at least one of the following: geographic location information of a first user equipment (UE), geographic location information of a second UE except the first UE, distance information between the first UE and the second UE, motion track information of the first UE, motion track information of the second UE, velocity and/or speed information of the first UE, velocity and/or speed information of the second UE, acceleration information of the first UE, a service type of the first UE, and load information of time-frequency resources of the first UE. The first UE is used for detecting first V2X information and/or sending second V2X information; and/or, the detection parameter includes a detection frequency of the first V2X information; and/or, the sending parameter includes a sending frequency of the second V2X information, the number of retransmissions for sending the second V2X information and a modulation mode and/or an encoding rate for sending the second V2X information; and/or, the first V2X information includes first V2X control information and/or first V2X data information; and/or, the second V2X information includes second V2X control information and/or second V2X data information.

In an optional embodiment, the process of acquiring at least one of the geographic location information of the second UE, the distance information between the first UE and the second UE, and the motion track information of the second UE, which are included in the user attribute information, includes: acquiring at least one of the geographic location information of the second UE, the distance information between the first UE and the second UE and the motion track information of the second UE according to third V2X information acquired from the second UE. In this embodiment, the third V2X information may carry geographic location information related to the second UE, so that the distance information between the first UE and the second UE can be determined according to the geographic location information of the second UE and the geographic location information of the first UE (the geographic location information of the first UE may be acquired according to related positioning techniques), or the motion track information of the second UE may be acquired according to the geographic location information of the second UE. In this embodiment, the third V2X information may further carry the motion track of the second UE.

In an optional embodiment, determining a detection parameter for detecting first V2X information according to the user attribute information includes at least one of the methods described below.

In a first method, a probability that the first UE has V2X communication demands is determined according to the geographic location information of the first UE included in the user attribute information, and the detection frequency of the first V2X information included in the detection parameter is determined according to the probability that the first UE has V2X communication demands. In this method, if the first UE determines that there is a high probability of V2X communication demand in its geographical location, the first UE detects the V2X information. Otherwise, the first UE does not detect the V2X information or the detection frequency of the V2X information is reduced. In this method, when the first UE determines the probability of V2X communication demands according to the acquired geographic location information of the first UE, if the distance between the first UE and the road is less than or not greater than a certain threshold distance, the probability of the existence of the V2X communication demands is determined as large. Otherwise, the probability of the existence of the V2X communication demands is determined as small. The geographic location information of the first UE may be acquired according to positioning techniques.

In a second method, whether the distance between first UE and second UE is less than a first predetermined distance is determined according to distance information between the first UE and the second UE included in the user attribute information, and the detection frequency of the first V2X information included in the detection parameter is determined according to a determination result. In this method, if another user equipment exists around the first UE or another user equipment is within a certain threshold distance range (i.e., the distance between the first UE and the second UE is less than the first predetermined distance, and the number of the second UEs is one or more), the first UE receives the first V2X information by using a high detection frequency. Otherwise, the first UE receives the first V2X information by using a low detection frequency. In this method, the first UE can determine whether another user equipment exists around the first UE according to whether the V2X information is detected. If the first UE can successfully receive the V2X information of any other user, it is determined that another user equipment exists around the first UE. Otherwise, it is determined that no other user equipment exists around the first UE. The successful reception of the V2X information mentioned above means that decoded V2X information can pass the Cyclic Redundancy Check (CRC). The first UE can determine the distance between the first UE and the second UE according to geographic location information related to the second UE and the geographic location information of the first UE included in the detected V2X information (corresponding to the third V2X information described earlier).

In a third method, a probability that the first UE and the second UE collide is determined according to motion track information and/or geographic location information and/or speed information of the first UE and motion track information and/or geographic location information and/or speed information of the second UE included in user attribute information; and a detection frequency of the first V2X information included in the detection parameter is determined according to the probability that the first UE and the second UE collide. In this method, when the first UE is located indoors and/or a distance between the user equipment and the road is greater than a threshold distance, the first UE sends the V2X information with a relatively low frequency or doesn't send the V2X information. Otherwise, the first UE sends the V2X information with a relatively high frequency. Alternatively, according to geographic coordinates A of the first UE and the motion track of another user equipment (corresponding to the above second UE), the first UE determines a point p that is closest to the coordinates A and is on the motion track, and calculates a distance d between the coordinates A to the point p. Furthermore, according to geographic coordinates B and coordinates of point p of the another user equipment as well as a speed of the first UE, the first UE calculates a time t for moving from the point B to the point p. When the time t is less than or not greater than a certain threshold value Th1 and the distance d is less than or not greater than a threshold value Th2, the first UE uses a higher sending frequency. Otherwise, the first UE uses a lower sending frequency. When multiple other user equipments exist, the first UE may calculate multiple sending frequencies for the multiple other user equipments, and the first UE uses the maximum one of the multiple sending frequencies. The motion track of the first UE can be acquired through geographic positioning techniques. When determining the motion track of another user equipment, the first UE may detect the V2X information received from the another user equipment to acquire the motion track directly from the V2X information. Alternatively, the first UE acquires geographic location information of another user equipment by receiving the V2X information from the another user equipment and further acquires the motion track information of the another user equipment according to the geographic location information of the another user equipment.

In an optional embodiment, determining a sending parameter for sending the second V2X information according to the user attribute information includes at least one of the methods described below.

In a first method, a probability that the first UE has V2X communication demands is determined according to geographic location information of the first UE, and the sending frequency of the second V2X information included in the sending parameter is determined according to the probability that the first UE has the V2X communication demands. In this method, if the first UE determines that the probability that the first UE has the V2X communication demands is large according to its geographic location, the first UE sends the second V2X information. Otherwise, the first UE does not send the second V2X information or sends the V2X information with a reduced sending frequency. In this method, when the first UE determines the probability of V2X communication demands according to the acquired geographic location information, if the distance between the first UE and the road is less than or not greater than a threshold distance, the probability of the V2X communication demands is determined as large. Otherwise, the probability of the V2X communication demands is determined as small.

In a second method, whether the distance between the first UE and the second UE is less than a second predetermined distance is determined according to the distance information between the first UE and the second UE included in user attribute information; and the sending frequency of the second V2X information included in the sending parameter is determined according to a determination result. In this method, if other user equipment exists around the first UE or other user equipment is within a certain threshold distance range (i.e., the distance between the first UE and the second UE is less than the second predetermined distance), the first UE sends the second V2X information by using a high sending frequency. Otherwise, the first UE sends the second V2X information by using a low sending frequency. In this method, the first UE may determine whether other user equipment exists around the first UE according to whether the V2X information is detected. The first UE may determine the distance between the first UE and other user equipment according to geographic location information related to the second UE included in the detected V2X information and the geographic location information of the first UE.

In a third method, a probability that the first UE and the second UE collide is determined according to motion track information and/or geographic location information and/or speed information of the first UE and motion track information and/or geographic location information and/or speed information of the UE included in the user attribute information; and the sending frequency of the second V2X information included in the sending parameter is determined according to the probability that the first UE and the second UE collide. In this method, when the first UE is located indoors and/or the distance between the user equipment and the road is greater than a certain threshold distance, the first UE uses a lower sending frequency to send the V2X information or doesn't send the V2X information. Otherwise, the first UE uses a higher sending frequency to send the V2X information. Alternatively, the first UE determines, according to its geographic coordinates A and the motion track of other user equipment, a point p that is closest to the coordinates A and is on the motion track and then calculates the distance d between the coordinates A and the point p. Moreover, the first UE calculates, according to the geographic coordinates B of other user equipment and the coordinates of point p as well as a speed of the first UE, the time t from the coordinates B to the point p. When the time t is less than or not greater than a threshold value Th1 and the distance d is less than or not greater than a threshold value Th2, the first UE use a higher sending frequency. Otherwise, the first UE uses lower sending frequency. When a plurality of other user equipments exists, the first UE may calculate a plurality of sending frequencies for these user equipments and select a maximum one of the plurality of sending frequencies as the sending frequency to be used. The motion track of the first UE may be acquired through geographic positioning techniques. The motion track of other user equipment may be acquired directly from the V2X information by detecting the V2X information. Alternatively, the first UE may acquire the geographic location information of other user equipment by receiving the V2X information of other user equipment, and may further acquire motion track information of the other user equipment according to the geographic location information of the other user equipment.

In a fourth method, whether the load of available time-frequency resources is higher than a first predetermined load threshold is determined according to the load information of time-frequency resources of first UE included in the user attribute information; and the sending frequency of the second V2X information included in the sending parameter is determined according to a determination result. In this method, if the load is higher than the first predetermined load threshold, the sending frequency of the V2X information is reduced. The detection of the load includes, but is not limited to, an energy-based detection method, a method of decoding V2X control signaling and the like.

In a fifth method, whether the velocity and/or speed of the first UE is higher than a first predetermined velocity and/or speed threshold is determined according to the velocity and/or speed information of the first UE included in user attribute information; and the sending frequency of the second V2X information included in the sending parameter is determined according to the determination result. In this method, when the velocity and/or speed of first UE is higher than the first predetermined velocity and/or speed threshold, a higher sending frequency is used. Otherwise, a lower sending frequency is used. The manner to acquire the velocity and/or speed includes, but is not limited to, a positioning technique based on a geographic location, a manner based on a related sensor device, and the like.

In a sixth method, whether the acceleration of the first UE is higher than a first predetermined acceleration threshold is determined according to the acceleration information of the first UE included in the user attribute information, and the sending frequency of the second V2X information included in the sending parameter is determined according to the determination result. When the absolute value of the acceleration is higher than the first predetermined acceleration threshold, a higher sending frequency is used. Otherwise, a lower sending frequency is used. The manner to acquire the acceleration includes, but is not limited to, a manner based on a related sensor device, and the like.

In a seventh method, whether the service type of the first UE belongs to a predetermined unexpected and emergent service type is determined according to the service type of the first UE included in the user attribute information, and the sending frequency of the second V2X information included in the sending parameter is determined according to the determination result. When the service type belongs to the predetermined unexpected and emergent service type, a higher sending frequency is used. Otherwise, a lower sending frequency is used.

In an optional embodiment, determining the sending parameter for sending the second V2X information according to the user attribute information includes at least one of the methods described below.

In a first method, a probability that first UE and second UE collide is determined according to the motion track information and/or geographic location information and/or speed information of the first UE and the motion track information and/or geographic location information and/or speed information of second UE included in the user attribute information, and the number of retransmissions for sending the second V2X information included in the sending parameter is determined according to the probability that the first UE and the second UE collide. In this method, if the first UE determines that the collision risk is low, the second V2X information is not retransmitted or retransmitted only once. Otherwise, the second V2X information is transmitted with a larger number of retransmissions, for example, being retransmitted once or being retransmitted more than once. In this method, when the first UE determines the probability of V2X communication demands according to the acquired geographic location information of the first UE, if the distance between the first UE and the road is less than or not greater than a threshold distance, the probability of the existence of the V2X communication demands is determined as large. Otherwise, the probability of the existence of the V2X communication demands is determined as small.

In a second method, whether a load of time-frequency resources is higher than a second predetermined load threshold is determined according to the load information of time-frequency resources of the first UE included in the user attribute information, and the number of retransmissions for sending the second V2X information included in the sending parameter is determined according to the determination result. The user equipment adaptively adjusts the number of retransmissions according to the acquired load on the V2X available resources. In this method, if the load acquired by the first UE is higher the second predetermined load threshold, the second V2X information is not retransmitted or retransmitted only once. Otherwise, the V2X information is transmitted with a larger number of retransmissions, for example, being retransmitted once or being retransmitted more than once. The acquisition of the load includes, but is not limited to, an energy-based detection method, a method of decoding V2X control signaling and the like.

In a third method, whether the velocity and/or speed of the first UE is higher than a second predetermined velocity and/or speed threshold is determined according to the velocity and/or speed information of the first UE included in the user attribute information; and the number of retransmissions for sending the second V2X information included in the sending parameter is determined according to the determination result. In this method, if the velocity and/or speed of the first UE is higher than the second predetermined velocity and/or speed threshold, a larger number of retransmissions are performed. Otherwise, a smaller number of retransmissions are performed. The manner to acquire the velocity and/or speed information includes, but is not limited to, a geographic location-based positioning technique, a manner based on a related sensor device, and the like.

In a fourth method, whether an acceleration of the first UE is higher than a second predetermined acceleration threshold is determined according to the acceleration information of the first UE included in the user attribute information, and the number of retransmissions for sending the second V2X information included in the sending parameter is determined according to the determination result. When the acceleration of the first UE is higher than the second predetermined acceleration threshold, more retransmissions are performed. Otherwise, less retransmissions are performed. The manner to acquire the acceleration information of the first UE includes, but is not limited to, a manner based on a related sensor device, and the like.

In a fifth method, whether the service type of first UE belongs to the predetermined unexpected and emergent service type is determined according to the service type of the first UE included in the user attribute information, and the number of retransmissions for sending the second V2X information included in the sending parameter is determined according to the determination result. In this method, when the service type of first UE belongs to the predetermined unexpected and emergent service type, a larger number of retransmissions are performed. Otherwise, a smaller number of retransmissions are performed.

In an optional embodiment, determining the sending parameter for sending the second V2X information according to the user attribute information includes at least one of the methods described below.

In a first method, a probability that the first UE and the second UE collide is determined according to the motion track information and/or geographic location information and/or speed information of the first UE and the motion track information and/or geographic location information and/or speed information of the second UE included in the user attribute information, and a modulation mode and/or an encoding rate for sending the second V2X information included in the sending parameter is determined according to the probability that the first UE and the second UE collide. In this method, if the first UE determines that the collision risk is high, a low-order modulation mode and/or a low encoding rate is used. Otherwise, a high-order modulation mode and/or a high encoding rate is used. In this method, when the first UE determines the probability of V2X communication demands according to the acquired geographic location information, if the distance between the user equipment and the road is less than or not greater than a certain threshold distance, the probability of the existence of the V2X communication demands is determined as large. Otherwise, the probability of the existence of the V2X communication demands is determined as small.

In a second method, whether a load of time-frequency resources is higher than a third predetermined load threshold is determined according to the load information of the available time-frequency resources of the first UE included in the user attribute information; and a modulation mode and/or an encoding rate for sending the second V2X information included in the sending parameter is determined according to the determination result. In this method, if the load is higher than the third predetermined load threshold, a low-order modulation mode and/or a low encoding rate is used. Otherwise, a high-order modulation mode and/or a higher encoding rate is used. The detection of the load includes, but is not limited to, an energy-based detection method, a method of decoding V2X control signaling, and the like.

In a third method, whether the velocity and/or speed of the first UE is higher than a third predetermined velocity and/or speed threshold is determined according to the velocity and/or speed information of the first UE included in the user attribute information; and a modulation mode and/or an encoding rate for sending the second V2X information included in the sending parameter is determined according to the determination result. In this method, if the velocity and/or speed of the first UE is higher than the third predetermined velocity and/or speed threshold, the first UE uses a low-order modulation mode and/or low encoding rate. Otherwise, the first UE uses a high-order modulation mode and/or a high encoding rate.

In a fourth method, whether an acceleration of the first UE is higher than a third predetermined acceleration threshold is determined according to the acceleration information of the first UE included in the user attribute information; and a modulation mode and/or an encoding rate for sending second V2X information included in the sending parameter is determined according to the determination result. In this method, when the acceleration of the first UE is higher than the third predetermined acceleration threshold, a low-order modulation mode and/or a low encoding rate is used. Otherwise, a high-order modulation mode and/or a high encoding rate is used. The manner to acquire the acceleration information includes, but is not limited to, a manner based on a related sensor device, and the like.

In a fifth method, whether the service type of the first UE belongs to a predetermined unexpected and emergent service type is determined according to the service type of the first UE included in the user attribute information; and a modulation mode and/or an encoding rate for sending the second V2X information included in the sending parameter is determined according to the determination result. In this method, if the service type belongs to the predetermined unexpected and emergent service type, a low-order modulation mode and/or a low encoding rate is used. Otherwise, a high-order modulation mode and/or a high encoding rate is used.

The present disclosure will be described hereinafter in detail with reference to the specific embodiments.

The technologies described in embodiments of the present disclosure apply to cellular communication systems or networks. A common cellular communication system may be based on technologies such as Code Division Multiplexing Access (CDMA), Frequency Division Multiplexing Access (FDMA), Orthogonal-FDMA (OFDMA) and Single Carrier-FDMA (SC-FDMA). For example, in a 3GPP LTE/LTE-A cellular communication system, a downlink (or forward link) is based on the OFDMA technology and an uplink (or reverse link) is based on the SC-FDMA technology. The technologies in embodiment of the present disclosure apply to CDMA, FDMA, OFDMA and SC-FDMA.

Figure 3:
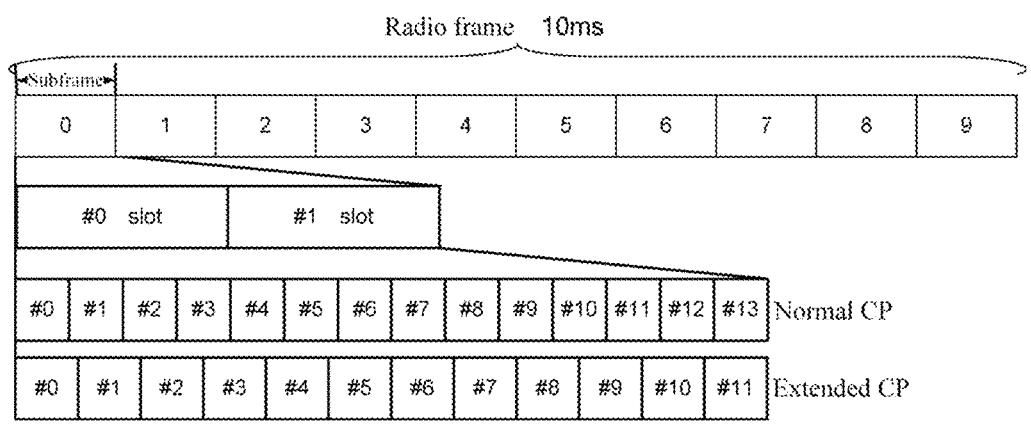
FIG. 3 is a schematic diagram of a structure of a LTE system frame according to an embodiment of the present disclosure.

In an OFDMA/SC-FDMA system, a radio resource used for communication is in a time-frequency form. For example, in an LTE/LTE-A system, communication resources of uplink and downlink are divided in radio frames in the time direction. Each radio frame is 10 ms and includes 10 sub-frames. Each sub-frame is 1 ms and includes two slots. Each slot is 0.5 ms. FIG. 3 is a schematic diagram of a frame structure of an LTE system according to an embodiment of the present disclosure. Depending on the configuration of a Cyclic Prefix (CP), each slot may contain 6 or 7 OFDM or SC-FDM symbols.

In the frequency direction, the resources are divided in units of subcarriers. In communications, the smallest unit for frequency domain resource allocation is a Resource Block (RB) that corresponds to a Physical RB (PRB). One PRB contains 12 subcarriers in the frequency domain that correspond to one slot in the time domain A resource corresponding to one subcarrier on each OFDM/SC-FDM symbol is called a Resource Element (RE).

Embodiments of the present disclosure provide an adaptive V2X information detection and sending mechanism. The adaptive V2X information detection and/or sending mechanism can solve the problem of congestion control, reduce interference and save energy in terminals.

An operating process of the present disclosure includes the steps described below.

In step 1, a user equipment acquires user attribute information.

The user attribute information includes one or more of the following information: geographic location information of the user equipment (corresponding to the above-mentioned first UE), geographic location information of other user equipment (corresponding to the above-mentioned second UE), distance information between the user equipment and other user equipment, motion track information of the user equipment, motion track information of other user equipment, speed/rate information of the user equipment, speed/rate information of other user equipment, acceleration information of the user equipment, a service type of the user equipment, and load information of available time-frequency resources.

In step 2, the user equipment determines a detection parameter and/or a sending parameter of the wireless communication according to the acquired user attribute information in step 1.

The detection parameter and/or the sending parameter of the wireless communication includes one or more of the following parameters: a detection frequency of information, a sending frequency of information, a number of retransmissions for sending information and a modulation mode and/or an encoding rate for sending information.

In step 3, the user equipment detects and/or sends information according to the detection parameter and/or sending parameter of the wireless communication determined in step 2.

The present disclosure will be further described hereinafter with reference to the specific embodiments.

Embodiment 1

The above user equipment determines a probability that the user equipment has V2X communication demands according to acquired geographic location information of the user equipment, and thereby determines whether to detect the V2X information and a detection frequency of the V2X information. The specific steps are described below.

In step 1, the user equipment determines its own geographic location through positioning techniques.

In step 2, the user equipment determines the probability of V2X communication demands according to acquired geographic location information.

In step 3, the user equipment determines whether to detect the V2X information and the detection frequency of the V2X information according to the probability of V2X communication demands.

For example, according to the acquired geographic location information in step 1 (for example, the user equipment is located indoors, such as handheld terminals), the probability of V2X communication demands is determined as small in step 2. Therefore, the user equipment doesn't detect the V2X information, thereby achieving the purpose of saving energy.

Figure 4:
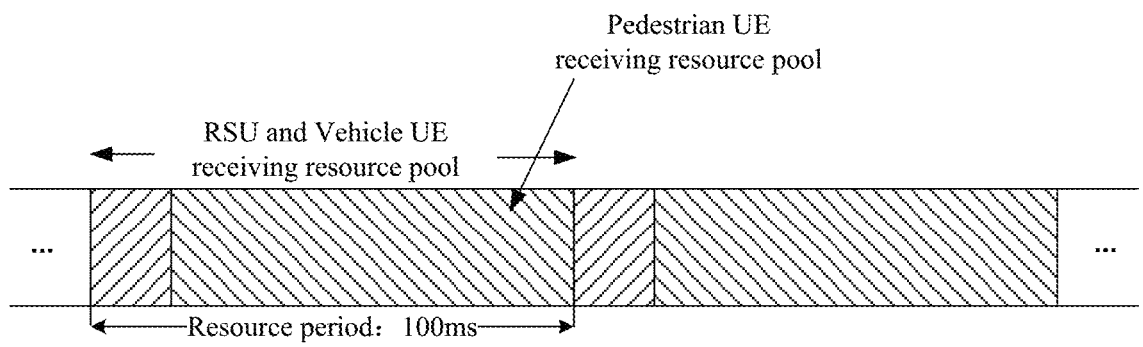
FIG. 4 is a schematic diagram of a V2X receiving resource pool according to an embodiment of the present disclosure.

Alternatively, according to the acquired geographic location information in step 1, the user equipment believes that the distance between it and the road is very small, and then the probability of the V2X communication demands is determined as large in step 2. Therefore, the user equipment detects the V2X information on all subframes of the V2X receiving resource pool. For example, the V2X receiving resource pool is shown in FIG. 4. FIG. 4 is a schematic diagram of a V2X receiving resource pool according to an embodiment of the present disclosure.

Alternatively, according to the acquired geographic location information in step 1, the user equipment believes that a probability that a vehicle appears at the geographic location of the user equipment is low, and then the probability of the V2X communication demands is determined as small in step 2. Therefore, the user equipment reduces the detection frequency of the V2X information. For example, on the V2X receiving resource pool, the V2X information is detected once every 10 resource pool periods or every 1000 subframes. The duration of each V2X information detection is 1 resource pool period or 100 consecutive V2X available subframes.

Embodiment 2

The user equipment determines a detection frequency of V2X information according to distances between the user equipment and other user equipments. The specific steps are described below.

In step 1, the user equipment acquires its own geographic location information.

In step 2, the user equipment detects V2X information and acquires geographic location information of other vehicles.

In step 3, the user equipment calculates the distance between the user equipment and one or more other user equipments according to the acquired geographic location information in steps 1 and 2.

In step 4, the user equipment determines the number of other user equipments within a certain threshold distance d, and further determines the detection frequency of the V2X information.

For example, if other user equipments exist within the certain threshold distance d, a high detection frequency is used for detecting the V2X information. For example, on the receiving resource pool, the V2X information is detected in every subframe. Otherwise, the user equipment uses a low detection frequency to detect the V2X information. For example, on the V2X receiving resource pool, the V2X information detection is performed every 10 resource pool periods and the duration of the V2X information detection is 1 resource pool period. Alternatively, the V2X information is detected once every 1000 subframes and each detection of the V2X information covers 100 consecutive or inconsecutive V2X available subframes.

Embodiment 3

The user equipment determines a detection frequency of the V2X information according to the motion track and/or geographic location information and/or speed information of the user equipment and motion tracks and/or geographic location information and/or speed information of other user equipments acquired by detecting the V2X information. The specific steps are described below.

In step 1, the user equipment acquires its own motion track and/or geographic location information and/or speed information based on positioning techniques and/or a sensor.

In step 2, the user equipment acquires the motion tracks and/or geographic location information and/or speed information of other user equipments by receiving the V2X information.

The motion tracks of other user equipments can be acquired directly in the V2X information by detecting the V2X information. Alternatively, the user equipment acquires the geographic location information of other user equipments by receiving the V2X information of other user equipments and further acquires the motion track information of other user equipments according to the geographic location information.

In step 3, a collision risk is predicted according to the acquired user attribute information in steps 1 and 2.

Figure 5:
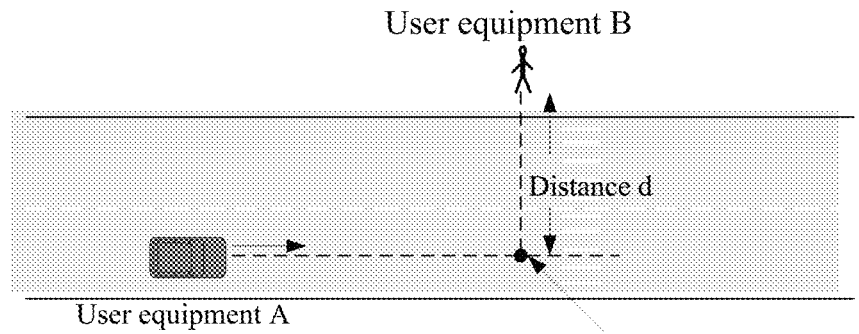
FIG. 5 is a schematic diagram of predicting a collision risk according to an embodiment of the present disclosure.

Using FIG. 5 as an example, the user equipment is a vehicle, and the other user equipments are terminals held by pedestrians. The vehicle predicts the collision risk according to its own geographic location information and/or motion track and/or speed information as well as the acquired geographic locations and/or speeds of the pedestrians. For example, the vehicle calculates the distance d between the vehicle track and the pedestrian, and calculates the time t required for the vehicle to travel to the point p in FIG. 5. If the calculated time is less than a threshold Th1 and the calculated distance d is less than a threshold Th2, then the vehicle determines that a high collision risk exists. Otherwise, the vehicle determines that a low collision risk exists. FIG. 5 is a schematic diagram of predicting the collision risk according to an embodiment of the present disclosure.

Similarly, when the user equipment is a pedestrian and the other user equipments are vehicles, the level of the collision risk can also be determined according to the acquired user attribute information in steps 1 and 2.

In step 4, the detection frequency of the V2X information is determined according to the determined level of the collision risk in step 3. For example, when the collision risk is high, a high detection frequency is used, for example, detecting the V2X information in every available V2X subframe (for example, a P2V subframe). Otherwise, the user equipment uses a low detection frequency; for example, on the V2X available resources, the V2X information is detected once every 1000 subframes and each detection of the V2X information covers 100 consecutive or inconsecutive V2X available subframes.

In step 5, the V2X information is received according to the detection frequency determined in step 4.

Embodiment 4

The user equipment determines whether V2X communication demands exist and further determines a transmission frequency of V2X information according to acquired geographic location information. The specific steps are described below.

In step 1, the user equipment determines its own geographic location through positioning techniques.

In step 2, the user equipment determines the probability of the existence of V2X communication demands according to acquired geographic location information.

In step 3, the user equipment determines whether to send the V2X information and the sending frequency of the V2X information according to the probability of the existence of V2X communication demands.

For example, according to the acquired geographic location information in step 1, the user equipment, such as a handheld terminal, is located indoors, the probability of the existence of V2X communication demands is determined as small in step 2. Therefore, the user equipment doesn't transmit the V2X information, thereby achieving the purpose of saving energy.

Figure 6:
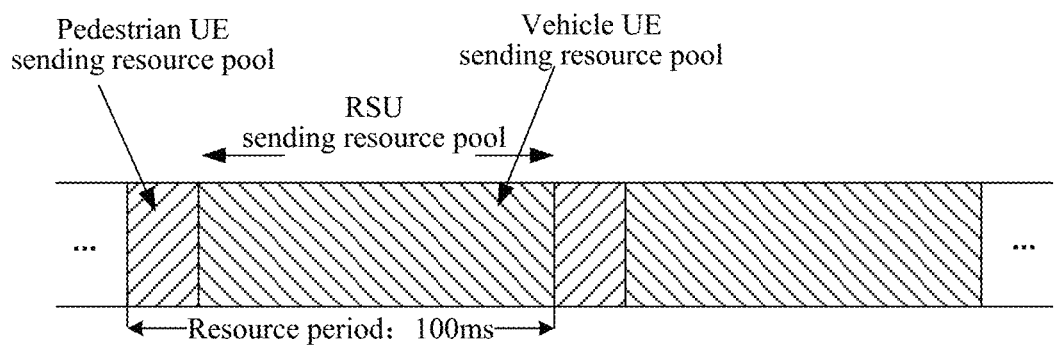
FIG. 6 is a schematic diagram of a V2X sending resource pool according to an embodiment of the present disclosure.

Alternatively, according to the acquired geographic location information in step 1, the user equipment believes that the distance to the road is very small, and then the probability of the existence of V2X communication demands is determined as large in step 2. Therefore, the user equipment sends the V2X information according to actual requirements. For example, on the V2X sending resource pool, the V2X information is transmitted once every 100 V2X subframes. For example, the V2X sending resource pool is shown in FIG. 6. FIG. 6 is a schematic diagram of a V2X sending resource pool according to an embodiment of the present disclosure.

Alternatively, according to the acquired geographic location information in step 1, the user equipment believes that a probability that a vehicle appears at the geographic location is low, and then the probability of the existence of V2X communication demands is determined as small in step 2. Therefore, the user equipment reduces the sending frequency of the V2X information. For example, on the V2X sending resource pool, the V2X information is transmitted once every 1000 subframes.

Embodiment 5

The user equipment determines the sending frequency of the V2X information according to distances between the user equipment and other user equipments. The specific steps are described below.

In step 1, the user equipment acquires its own geographic location information.

In step 2, the user equipment detects V2X information and acquires geographic location information of other vehicles.

In step 3, the user equipment calculates the distances between the user equipment and one or more other user equipments according to the acquired geographic location information in steps 1 and 2.

In step 4, the user equipment determines the number of other user equipments within a certain threshold distance d, and further determines the sending frequency of the V2X information.

For example, if other user equipments exist within the certain threshold distance d, a high sending frequency is used for sending the V2X information. For example, the V2X information is sent once every 1 resource pool period or every 100 V2X available subframes. Otherwise, the user equipment uses a low sending frequency to send the V2X information. For example, on the V2X available resources, the V2X information is transmitted once every 10 resource pool periods or every 1,000 subframes.

Embodiment 6

The user equipment determines the sending frequency of the V2X information according to the motion track and/or geographic location information and/or speed information of the user equipment and motion tracks and/or geographic location information and/or speed information of other user equipments acquired by detecting the V2X information. The specific steps are described below.

In step 1, the user equipment acquires its own motion track and/or geographic location information and/or speed information according to positioning techniques and/or detection by a sensor.

In step 2, the user equipment acquires the motion tracks and/or geographic location information and/or speed information of other user equipments by receiving the V2X information.

The motion tracks of other user equipments can be acquired directly in the V2X information by detecting the V2X information. Alternatively, the user equipment acquires the geographic location information of other user equipments by receiving the V2X information of other user equipments and further acquires the motion track information of other user equipments according to the geographic location information.

In step 3, a collision risk is predicted according to the acquired user attribute information in steps 1 and 2.

For example, the user equipment is a vehicle, and the other user equipment is a terminal held by a pedestrian. The vehicle calculates the distance d between the motion track of the vehicle and the pedestrian based on the acquired geographic location information and/or motion track and/or speed information of the vehicle as well as the acquired geographic location and/or speed of the pedestrian. The vehicle further calculates the time t required for the vehicle to travel to the point closest to the pedestrian on the predicted track. If the calculated time is less than a threshold Th1 and the calculated distance d is less than a threshold Th2, then the vehicle determines that a high collision risk exists. Otherwise, the vehicle determines that a low collision risk exists.

Similarly, when the user equipment is a pedestrian and the other user equipment is a vehicle, the level of collision risks can also be determined according to the user attribute information acquired in steps 1 and 2.

In step 4: the sending frequency of the V2X information is determined according to the determined level of the collision risk in step 3.

For example, when the collision risk is determined as high in step 3, a high sending frequency is used to send the V2X information, for example, the V2X information is sent once every 100 V2X available subframes or every 1 resource pool period. Otherwise, the user equipment uses a low sending frequency to send the V2X information. For example, on the V2X available resource, the V2X information is sent every 10 resource pool periods or every 1000 subframes.

In step 5: the V2X information is sent according to the sending frequency determined in step 4.

Embodiment 7

The user equipment adaptively adjusts the sending frequency of V2X information according to the acquired load on V2X available resources. The specific steps are described below.

In step 1, the user equipment detects the resource load on the V2X resources. The detection of the load includes, but is not limited to, an energy-based detection method, a method of decoding V2X control signaling, and the like.

In step 2, the sending frequency of the V2X information is determined according to the resource load.

For example, when the resource load detected by the user equipment is less than or not greater than a threshold value Th1, the sending frequency of the V2X information is determined according to actual requirements of the service, for example, sending the V2X information once every 100 V2X subframes.

Alternatively, when the resource load detected by the user equipment is greater than or not less than a threshold value Th2, the user equipment reduces the sending frequency on the basis of a latest used sending frequency until the resource load detected by the user equipment is less than or not greater than the threshold value Th2.

Alternatively, if the resource load is greater than or not less than Th1 and less than or not greater than threshold Th2, then the user equipment uses the latest used sending frequency.

The threshold value Th1 is less than or not greater than the threshold value Th2.

In step 3, the user equipment sends the V2X information according to the sending frequency determined in step 2.

Embodiment 8

The user equipment determines the sending frequency of V2X information according to speed or rate information of the user equipment. The specific steps are described below.

In step 1, the user equipment acquires its own speed or rate information according to positioning techniques and/or detection by a sensor.

In step 2, the user equipment determines the sending frequency of the V2X information according to the acquired speed or rate information.

For example, if the speed or rate is greater than or not less than a certain threshold value, a high sending frequency is used for sending the V2X information. For example, the V2X information is sent once every 100 V2X available subframes. Otherwise, the user equipment uses a low sending frequency to transmit the V2X information. For example, on the V2X available resources, the V2X information is sent once every 1000 subframes.

In step 3, the user equipment sends the V2X information with the sending frequency determined in step 2.

Embodiment 9

The user equipment determines the sending frequency of V2X information according to the acceleration information of the user equipment or the service type of V2X information to be sent. The specific steps are described below.

In step 1, the user equipment acquires its own acceleration information or the service type of the V2X information to be sent.

The acceleration information can be acquired through monitoring the user equipment by a sensor device.

In step 2, the user equipment determines the sending frequency of the V2X information according to the acquired acceleration information or the service type of the V2X information to be sent.

For example, if the absolute value of the acceleration is greater than or not less than a certain threshold value, or the service type belongs to an unexpected and emergent service type, a high sending frequency is used to send the V2X information, for example, sending the V2X information once every 100 V2X available subframes. Otherwise, the user equipment uses a low sending frequency to send the V2X information. For example, on V2X available resources, the V2X information is sent once every 1000 subframes.

In step 3, the user equipment sends the V2X information with the sending frequency determined in step 2.

Embodiment 10

The user equipment determines whether V2X communication demands exist and further determines the number of retransmissions of V2X information according to acquired geographic location information. The specific steps are described below.

In step 1, the user equipment acquires its own geographic location information and/or geographic location information of other user equipments.

The geographic location information of the user equipment may be acquired through positioning techniques and the geographic location information of other user equipments may be acquired by receiving the V2X information of the user equipment.

In step 2, the user equipment determines the level of a collision risk according to the acquired geographic location information of the user equipment and/or the geographic location information of other user equipments.

In step 3, the user equipment determines the number of retransmissions of the V2X information according to the level of the collision risk.

For example, if the user equipment determines that it is closer to a crossroad and thus has a greater collision risk, a larger number of retransmissions are performed, for example, retransmitting once or more than once. Otherwise, the user equipment uses a smaller number of retransmissions, for example, not retransmitting or retransmitting for one time.

In step 4, the user equipment sends the V2X information according to the number of retransmissions determined in step 3.

Embodiment 11

The user equipment adaptively adjusts the number of retransmissions according to an acquired load on V2X available resources. The specific steps are described below.

In step 1, the user equipment detects the load of V2X resources within a certain time domain window to acquire a resource load value.

In step 2, the number of retransmissions of V2X information is determined according to the acquired resource load value.

For example, if the resource load value is greater than or no less than a certain threshold value, the V2X information is not retransmitted or retransmitted for only one time.

Alternatively, if the resource load value is less than or not greater than a certain threshold value, the V2X information is sent with a larger number of retransmissions, for example, being retransmitted once or being retransmitted more than once.

In step 3, the user equipment sends the V2X information according to the number of retransmissions of the V2X information determined in step 2.

Embodiment 12

The user equipment determines the number of retransmissions of V2X information according to speed or rate information of the user equipment. The specific steps are described below.

In step 1, the user equipment acquires its own speed or rate information according to positioning techniques and/or detection by a sensor.

In step 2, the user equipment determines the number of retransmissions of the V2X information according to the acquired speed or rate information.

For example, if the speed or rate is less than or not greater than a certain threshold value, the V2X information is not retransmitted or retransmitted only once.

Alternatively, if the speed or rate is greater than or not less than a certain threshold value, the V2X information is sent with a larger number of retransmissions, for example, being retransmitted once or being retransmitted more than once.

In step 3, the user equipment sends the V2X information according to the number of retransmissions of the V2X information determined in step 2.

Embodiment 13

The user equipment determines the number of retransmissions of V2X information according to acceleration information of the user equipment or a service type of V2X information to be transmitted. The specific steps are described below.

In step 1: the user equipment acquires its own acceleration information or the service type of the V2X information to be transmitted.

The acceleration information can be acquired through the monitoring the user equipment by a sensor device.

In step 2: the user equipment determines the number of retransmissions of the V2X information according to the acquired acceleration information of the user equipment or the service type of the V2X information to be transmitted.

For example, if the absolute value of the acceleration is greater than or not less than a certain threshold value, or the service type belongs to an unexpected and emergent service type, the V2X information is sent with a larger number of retransmissions, for example, being retransmitted once or being retransmitted more than once. Otherwise, the sending of the V2X information is transmitted with a larger number of retransmissions, for example, being retransmitted once or being retransmitted more than once.

In step 3: the user equipment sends the V2X information according to the number of retransmission of the V2X information determined in step 2.

Embodiment 14

The user equipment determines the level of the collision risk and further determines a modulation mode and an encoding rate according to acquired geographic location information of the user equipment and/or geographic location information of other user equipments. The specific steps are described below.

In step 1, the user equipment acquires its own geographic location information and/or the geographic location information of other user equipments.

The geographic location information of the user equipment can be acquired through positioning techniques and the geographic location information of other user equipments can be acquired by receiving V2X information of the other user equipments.

In step 2, the user equipment evaluates the level of the collision risk.

The user equipment evaluates the level of the collision risk at the location of the user equipment according to the geographic location information of the user equipment and/ or the geographic location information of other user equipments. For example, if the user equipment is close to a crossroad, the user equipment determines that a high level of collision risk exists.

In step 3, a modulation coding scheme (MCS) is determined according to the level of the collision risk.

If, in the step 2, it is determined that a high level of collision risk exists, the user equipment uses a low MCS level, thus improving the probability that the V2X information is correctly received and increasing the coverage of the V2X information. Otherwise, the user equipment uses a high MCS level, thereby reducing the load on V2X resources and reducing interference to other user equipments.

In step 4, the user equipment sends the V2X information according to the MCS determined in step 3.

Embodiment 15

The user equipment adaptively adjusts a modulation mode and/or an encoding rate of V2X information according to an acquired load on V2X available resources. The specific steps are described below.

In step 1, the user equipment detects the usage of the V2X resources within a certain time domain window to acquire a resource load value.

In step 2, an MCS is determined according to the acquired resource load value. If the acquired load value is less than or not greater than a certain threshold value, the user equipment uses a low-order MCS. If the acquired load value is greater than or not less than a certain threshold value, the user equipment uses a high-order MCS.

In step 3, the user equipment sends the V2X information according to the MCS determined in step 2.

Embodiment 16

The user equipment determines a modulation mode and/or an encoding rate for sending the V2X information according to velocity and/or speed information of the user equipment. The specific steps are described below.

In step 1, the user equipment acquires its own velocity and/or speed information. The manner to acquire the velocity and/or speed information includes, but is not limited to, a positioning technique based on geographic location, a manner based on a related sensor device, and the like.

In step 2, an MCS is determined according to the acquired rate value. If the acquired rate value is less than or not greater than a certain threshold value, the user equipment uses a high-order MCS. If the acquired rate value is greater than or not less than a certain threshold value, the user equipment uses a low-order MCS.

In step 3, the user equipment sends the V2X information according to the MCS determined in step 2.

Embodiment 17

The user equipment determines a modulation mode and/or an encoding rate of V2X information according to acceleration information of the user equipment or a service type of V2X information to be transmitted. The specific steps are described below.

In step 1, the user equipment acquires its own acceleration information or the service type of V2X information to be transmitted.

The acceleration information can be acquired through the monitoring of a sensor device.

In step 2, the user equipment determines the modulation mode and/or the encoding rate of V2X information according to the acquired acceleration information or the service type of V2X information to be transmitted.

For example, if the absolute value of the acceleration is greater than or not less than a certain threshold value, or the service type belongs to an unexpected and emergent service type, the V2X information is sent with a low-order MCS. Otherwise, the V2X information is sent with a high-order MCS.

In step 3: the user equipment sends the V2X information according to the MCS determined in step 2.

From the description of the embodiments described above, those skilled in the art should understand that the method of any embodiment described above may be implemented by means of software plus a necessary general-purpose hardware platform, or may of course be implemented by hardware, but in many cases, the former is a preferred implementation mode. Based on this understanding, the solution provided by the present disclosure substantially, or the part contributing to the existing art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present disclosure.

Embodiments of the present disclosure further provide a V2X communication device for implementing the above-mentioned embodiments and preferred embodiments. What has been described will not be repeated. As used below, the term "module" may be software, hardware or a combination thereof capable of implementing preset functions. The device in the embodiment described below is preferably implemented by software, but implementation by hardware or by a combination of software and hardware is also possible and conceived.

Figure 7:
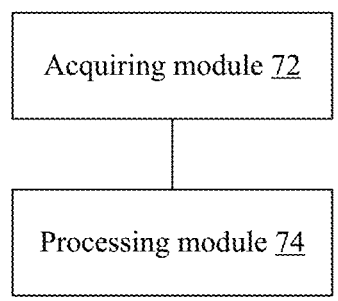
FIG. 7 is a block diagram of a V2X communication device according to an embodiment of the present disclosure.

FIG. 7 is a block diagram of a V2X communication device according to an embodiment of the present disclosure. With reference to FIG. 7, the device includes an acquiring module 72 and a processing module 74. The device is described below.

The acquiring module 72 is configured for acquiring user attribute information. The processing module 74 is connected to the acquiring module 72, and is configured for detecting a detection parameter for detecting first V2X information according to the user attribute information, and detecting the first V2X information according to the detection parameter; and/or determining a sending parameter for sending second V2X information according to the user attribute information, and sending the second V2X information according to the sending parameter.

In an optional embodiment, the user attribute information may include at least one of the following: geographic location information of a first user equipment (UE), geographic location information of a second UE except the first UE, distance information between the first UE and the second UE, motion track information of the first UE, motion track information of the second UE, velocity and/or speed information of the first UE, velocity and/or speed information of the second UE, acceleration information of the first UE, a service type of the first UE, and load information of time-frequency resources of the first UE. The first UE is used for detecting the first V2X information and/or sending the second V2X information; and/or, the detection parameter includes a detection frequency of the first V2X information;

and/or, the sending parameter includes a sending frequency of the second V2X information, a number of retransmissions for sending the second V2X information and a modulation mode and/or an encoding rate for sending the second V2X information; and/or, the first V2X information includes first V2X control information and/or first V2X data information; and/or, the second V2X information includes second V2X control information and/or second V2X data information.

In an optional embodiment, when at least one of the geographic location information of the second UE, the distance information between the first UE and the second UE, and the motion track information of the second UE, which are included in the user attribute information, is acquired, the acquiring module 72 includes: an acquiring unit. The acquiring unit is configured for acquiring at least one of the geographic location information of the second UE, the distance information between the first UE and the second UE and the motion track information of the second UE according to third V2X information received from the second UE.

In an optional embodiment, when the detection parameter for detecting the first V2X information is determined according to the user attribute information, the processing module 74 includes at least one of the following: a first processing unit, which is configured for determining a probability that first UE has V2X communication demands according to the geographic location information of the first UE included the in user attribute information, and determining the detection frequency of the first V2X information included in the detection parameter according to the probability that the first UE has V2X communication demands; a second processing unit, which is configured for determining whether a distance between the first UE and the second UE is less than a first predetermined distance according to the distance information between the first UE and the second UE included in the user attribute information, and determining the detection frequency of the first V2X information included in the detection parameter according to the determination result; and a third processing unit, which is configured for determining a probability that first UE and second UE collide according to the motion track information and/or geographic location information and/or speed information of the first UE and the motion track information and/or geographic location information and/or speed information of the second UE included in the user attribute information, and determining the detection frequency of the first V2X information included in the detection parameter according to the probability that the first UE and the second UE collide.

In an optional embodiment, when the sending parameter for sending the second V2X information is determined according to the user attribute information, the processing module 74 includes at least one of the following: a forth processing unit, a fifth processing unit, a sixth processing unit, a seventh processing unit, an eighth processing unit, a ninth processing unit, and a tenth processing unit. The forth processing unit is configured for determining a probability that the first UE has V2X communication demands according to the geographic location information of the first UE included in the user attribute information, and determining the sending frequency of the second V2X information included in the sending parameter according to the probability that the first UE has V2X communication demands. The fifth processing unit is configured for determining whether the distance between the first UE and the second UE is less than a second predetermined distance according to the distance information between the first UE and the second UE included in the user attribute information, and determining the sending frequency of the second V2X information included in the sending parameter according to a determination result. The sixth processing unit is configured for determining a probability that the first UE and the second UE collide according to the motion track information and/or geographic location information and/or speed information of the first UE and motion track information and/or geographic location information and/or speed information of the second UE included in the user attribute information, and determining the sending frequency of the second V2X information included in the sending parameter according to the probability that the first UE and the second UE collide. The seventh processing unit is configured for determining whether a load of time-frequency resources is higher than a first predetermined load threshold according to the load information of time-frequency resources of the first UE included in the user attribute information, and determining the sending frequency of the second V2X information included in the sending parameter according to a determination result. The eighth processing unit is configured for determining whether a velocity and/or speed of the first UE is higher than a first predetermined velocity and/or speed threshold according to velocity and/or speed information of the first UE included in the user attribute information, and determining the sending frequency of the second V2X information included in the sending parameter according to a determination result. The ninth processing unit is configured for determining whether an acceleration of the first UE is higher than a first predetermined acceleration threshold according to the acceleration information of the first UE included in the user attribute information, and determining the sending frequency of the second V2X information included in the sending parameter according to a determination result. The tenth processing unit is configured for determining whether the service type of the first UE belongs to a predetermined unexpected and emergent service type according to the service type of the first UE included in the user attribute information, and determining the sending frequency of the second V2X information included in the sending parameter according to the determination result.

In an optional embodiment, when the sending parameter for sending the second V2X information is determined according to the user attribute information, the processing module 74 includes at least one of the following: an eleventh processing unit, a twelfth processing unit, a thirteenth processing unit, fourteenth processing unit, and a fifteenth processing unit. The eleventh processing unit is configured for determining a probability that the first UE and the second UE collide according to the motion track information and/or geographic location information and/or speed information of the first UE and motion track information and/or geographic location information and/or speed information of the second UE included in the user attribute information, and determining a number of retransmissions for sending the second V2X information included in the sending parameter according to the probability that the first UE and the second UE collide. The twelfth processing unit is configured for determining whether a load of time-frequency resources is higher than a second predetermined load threshold according to the load information of time-frequency resources of the first UE included in the user attribute information, and determining the number of retransmissions for sending the second V2X information included in the sending parameter according to a determination result. The thirteenth processing unit is configured for determining whether a velocity and/or speed of the first UE is higher than a second predetermined velocity and/or speed threshold according to the velocity and/or speed information of the first UE included in the user attribute information, and determining the number of retransmissions for sending the second V2X information included in the sending parameter according to a determination result. The fourteenth processing unit is configured for determining whether an acceleration of the first UE is higher than a second predetermined acceleration threshold according to the acceleration information of the first UE included in the user attribute information, and determining the number of retransmissions for sending the second V2X information included in the sending parameter according to a determination result. The fifteenth processing unit is configured for determining whether the service type of the first UE belongs to a predetermined unexpected and emergent service type according to the service type of the first UE included in the user attribute information, and determining the number of retransmissions for sending the second V2X information included in the sending parameter according to a determination result.

In an optional embodiment, when the sending parameter for sending the second V2X information is determined according to the user attribute information, the processing module 74 includes at least one of the following: a sixteenth processing unit, a seventeenth processing unit, an eighteenth processing unit, a nineteenth processing unit, and a twentieth processing unit. The sixteenth processing unit is configured for determining a probability that the first UE and the second UE collide according to the motion track information and/or geographic location information and/or the speed information of the first UE and the motion track information and/or geographic location information and/or speed information of the second UE included in the user attribute information, and determining the modulation mode and/or the encoding rate for sending the second V2X information included in the sending parameter according to the probability that the first UE and the second UE collide. The seventeenth processing unit is configured for determining whether a load of time-frequency resources is higher than a third predetermined load threshold according to the load information of time-frequency resources of the first UE included in the user attribute information, and determining the modulation mode and/or the encoding rate for sending the second V2X information included in the sending parameter according to a determination result. The eighteenth processing unit is configured for determining whether a velocity and/or speed of the first UE is higher than a third predetermined velocity and/or speed threshold according to the velocity and/or speed information of the first UE included in the user attribute information, and determining the modulation mode and/or the encoding rate for sending the second V2X information included in the sending parameter according to a determination result. The nineteenth processing unit is configured for determining whether an acceleration of the first UE is higher than a third predetermined acceleration threshold according to the acceleration information of the first UE included in the user attribute information, and determining the modulation mode and/or the encoding rate for sending the second V2X information included in the sending parameter according to a determination result. The twentieth processing unit is configured for determining whether the service type of the first UE belongs to a predetermined unexpected and emergent service type according to the service type of first UE included in the user attribute information, and determining the modulation mode and/or the encoding rate for sending the second V2X information included in the sending parameter according to a determination result.

The various modules described above may be implemented by software or hardware. Implementation by hardware may, but may not necessarily, be performed by the following method: The various modules described above are located in a same processor or multiple processors respectively.

An embodiment of the present disclosure further provides a storage medium. Optionally, in this embodiment, the storage medium may be configured to store program codes for executing the steps described below.

In S1, user attribute information is acquired.

S2: a detection parameter for detecting first V2X information is determined according to the user attribute information, and the first V2X information is detected according to the detection parameter; and/or a sending parameter for sending second V2X information is determined according to the user attribute information, and the second V2X information is sent according to the sending parameter.

Optionally, in this embodiment, the storage medium may include, but is not limited to, a U disk, a read-only memory (ROM), a random access memory (RAM), a mobile hard disk, a magnetic disk, an optical disk or another medium capable of storing program codes.

Optionally, in this embodiment, the processor executes the above steps according to the program codes stored in the storage medium.

Optionally, for specific examples in this embodiment, reference may be made to the examples described in the above embodiments and optional implementation modes, and the specific examples will not be repeated in this embodiment.

Apparently, those skilled in the art should know that each of the above-mentioned modules or steps of the present disclosure may be implemented by a universal computing device, the modules or steps may be concentrated on a single computing device or distributed on a network formed by multiple computing devices, and optionally, they may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. Therefore, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

INDUSTRIAL APPLICABILITY

As described above, a V2X communication method and device provided by embodiments of the present disclosure have the following beneficial effects. Problems that resource congestion and energy limitation are prone to occur in V2X communication in the related art that are solved, thereby improving the reliability of V2X communication, implementing congestion control and saving energy.

What is claimed is:

1. A non-transitory computer computer-readable storage medium storing executable instructions that, when executed by a first user equipment (UE), cause the first UE to:
acquire velocity or speed information of the first UE;
determine a number of retransmissions according to the velocity or speed information of the first UE;
determine a modulation and coding scheme (MCS) according to the velocity or speed information of the first UE; and
perform V2X communication with a second UE based on the number of retransmissions and the MCS,
wherein determining the number of retransmissions comprises:
determining whether a velocity or speed of the first UE is greater than a first predetermined velocity or speed threshold according to the velocity or speed information of the first UE;
in response to determining that the velocity or speed of the first UE is greater than the first predetermined velocity or speed threshold, determine that the number of retransmissions is a first value; and
in response to determining that the velocity or speed of the first UE is less than the first predetermined velocity or speed threshold, determine that the number of retransmissions is a second value,
wherein the first value is greater than the second value.

2. The non-transitory computer computer-readable storage medium of claim 1, wherein the first value is greater than or equal to 1, and the second value is 0.

3. The non-transitory computer computer-readable storage medium of claim 1, wherein determining the MCS comprises:
determining, by the first UE, whether a velocity or speed of the first UE is greater than a second predetermined velocity or speed threshold according to the velocity or speed information of the first UE;
in response to determining that the velocity or speed of the first UE is greater than the second predetermined velocity or speed threshold, determining that the MCS is a first MCS; and
in response to determining the velocity or speed of the first UE is less than the second predetermined velocity or speed threshold, determining that the MCS is a second MSC,
wherein an order of the first MCS is lower than an order of the second MCS.

4. A V2X communication method, comprising:
acquiring, by a first user equipment (UE), velocity or speed information of the first UE;
determining, by the first UE, a number of retransmissions according to the velocity or speed information of the first UE;
determining, by the first UE, a modulation and coding scheme (MCS) according to the velocity or speed information of the first UE; and
performing, by the first UE, V2X communicate with a second UE based on the number of retransmissions and the MCS,
wherein determining the number of retransmissions comprises:
determining whether a velocity or speed of the first UE is greater than a first predetermined velocity or speed threshold according to the velocity or speed information of the first UE;
in response to determining that the velocity or speed of the first UE is greater than the first predetermined velocity or speed threshold, determine that the number of retransmissions is a first value; and
in response to determining that the velocity or speed of the first UE is less than the first predetermined velocity or speed threshold, determine that the number of retransmissions is a second value,
wherein the first value is greater than the second value.

5. The method of claim 4, wherein the first value is greater than or equal to 1, and the second value is 0.

6. The method of claim 4, wherein determining the MCS comprises:
determining, by the first UE, whether a velocity or speed of the first UE is greater than a second predetermined velocity or speed threshold according to the velocity or speed information of the first UE;
in response to determining that the velocity or speed of the first UE is greater than the second predetermined velocity or speed threshold, determining that the MCS is a first MCS; and
in response to determining the velocity or speed of the first UE is less than the second predetermined velocity or speed threshold, determining that the MCS is a second MSC,
wherein an order of the first MCS is lower than an order of the second MCS.

7. A V2X communication device, applied in a first user equipment (UE), comprising:
a processor; and
a memory connected with the processor for storing instructions executable by the processor,
wherein execution of the instructions by the processor causes the processor to perform a V2X communication method,
wherein the V2X communication method comprises:
acquiring velocity or speed information of the first UE;
determining a number of retransmissions according to the velocity or speed information of the first UE;
determining a modulation and coding scheme (MCS) according to the velocity or speed information of the first UE; and
performing V2X communication with a second UE based on the number of retransmissions and the MCS,
wherein determining the number of retransmissions comprises:
determining whether a velocity or speed of the first UE is greater than a first predetermined velocity or speed threshold according to the velocity or speed information of the first UE;
in response to determining that the velocity or speed of the first UE is greater than the first predetermined velocity or speed threshold, determine that the number of retransmissions is a first value; and
in response to determining that the velocity or speed of the first UE is less than the first predetermined velocity or speed threshold, determine that the number of retransmissions is a second value,
wherein the first value is greater than the second value.

8. The device of claim 7, wherein the first value is greater than or equal to 1, and the second value is 0.

9. The device of claim 7, wherein determining the MCS comprises:
determining, by the first UE, whether a velocity or speed of the first UE is greater than a second predetermined velocity or speed threshold according to the velocity or speed information of the first UE;

in response to determining that the velocity or speed of the first UE is greater than the second predetermined velocity or speed threshold, determining that the MCS is a first MCS; and in response to determining the velocity or speed of the first UE is less than the second predetermined velocity or speed threshold, determining that the MCS is a second MSC, wherein an order of the first MCS is lower than an order of the second MCS.

* * * * *